United States Patent [19]

Rostock et al.

[11] 4,224,437

[45] Sep. 23, 1980

[54] PROCESS FOR PREVENTION OF FOAMING WHEN STEAM-STRIPPING RESIDUAL MONOMER FROM AQUEOUS POLYMER DISPERSIONS

[75] Inventors: Kai Rostock, Burghausen; Johann Birke, Marktl; Rudolf Wiedholz, Burghausen; Johann Bauer, Burghausen; Thomas Balwe, Burghausen, all of Fed. Rep. of Germany

[73] Assignee: Wacker-Chemie GmbH, Munich, Fed. Rep. of Germany

[21] Appl. No.: 944,404

[22] Filed: Sep. 21, 1978

[30] Foreign Application Priority Data

Oct. 3, 1977 [DE] Fed. Rep. of Germany ....... 2744462

[51] Int. Cl.$^2$ ............................ C08F 6/16; C08F 6/24
[52] U.S. Cl. ............................. 528/500; 260/29.6 PT
[58] Field of Search ................. 260/29.6 R, 29.6 PT, 260/29.7 PT; 526/500

[56] References Cited

U.S. PATENT DOCUMENTS

| | | | |
|---|---|---|---|
| 2,451,332 | 10/1948 | Green | 528/500 |
| 2,462,013 | 2/1949 | Waterman | 528/500 |
| 2,927,065 | 3/1960 | Gerlicher et al. | 528/500 |
| 4,017,445 | 4/1977 | Wortmann et al. | 528/500 |

OTHER PUBLICATIONS

Research Disclosure, No. 137, Sep. 1975, pp. 25 and 26.

*Primary Examiner*—Edward J. Smith
*Attorney, Agent, or Firm*—Hammond & Littell, Weissenberger and Muserlian

[57] ABSTRACT

In the process for steam-stripping residual monomer from an aqueous polymer dispersion comprising injecting steam into an aqueous polymer dispersion containing residual monomers and the customary amounts of emulsifiers and/or protective colloids, said dispersion having a solids content of from 15% to 55% by weight with simultaneous evacuation of the gas space above the dispersion whereby said gas space is maintained at a subatmospheric pressure and said residual monomers are volatilized, the improvement consisting of injecting a sufficient volume of steam into said aqueous polymer dispersion whereby from 5% to 50% by weight of the injected steam passes through said dispersion uncondensed, thereby substantially preventing formation of foam above said dispersion.

3 Claims, No Drawings ns of ethylenically-unsaturated monomers, vinyl

PROCESS FOR PREVENTION OF FOAMING WHEN STEAM-STRIPPING RESIDUAL MONOMER FROM AQUEOUS POLYMER DISPERSIONS

BACKGROUND OF THE INVENTION

In removing residual monomer from aqueous polymer dispersions, following the polymerization process, severe foaming problems occur, especially during vacuum treatment. These foam layers, such as are formed, in particular, on vacuum treatment with simultaneous blowing in of steam, inhibit the unhindered passage of the stripping gas, and the material transfer from the dispersion into the gas space (volatilization of residual monomers), and hence altogether interfere with the success of effective removal of residual monomer from the polymerization batch. The toxicity of some monomers such as, for example, vinyl chloride, having been recognized, great value is attached to low residual monomer contents in polymerization products. Hitherto, attempts have been made to solve the foam problem by chemical anti-foam agents and by mechanical devices for combating foam. A process for blowing steam into the foam layer also did not give sufficiently satisfactory results.

OBJECTS OF THE INVENTION

An object of the invention is to provide a process for the prevention of foaming when removing residual monomer from aqueous polymer dispersions.

Another object of the present invention is the development of the improvement in the process for steam-stripping residual monomer from an aqueous polymer dispersion comprising injecting steam into an aqueous polymer dispersion containing residual monomers and the customary amounts of emulsifiers and/or protective colloids, said dispersion having a solids content of from 15% to 55% by weight with simultaneous evacuation of the gas space above the dispersion whereby said gas space is maintained at a subatmospheric pressure and said residual monomers are volatilized, the improvement consisting of injecting a sufficient volume of steam into said aqueous polymer dispersion whereby from 5% to 50% by weight of the injected steam passes through said dispersion uncondensed, thereby substantially preventing formation of foam above said dispersion.

These and other objects of the invention will become more apparent as the description thereof proceeds.

DESCRIPTION OF THE INVENTION

The subject of the invention is a process for prevention of foaming when removing residual monomer from aqueous polymer dispersions, especially of polymers containing vinyl chloride, which dispersions contain customary amounts of emulsifiers and/or protective colloids and have solids contents of between 15% and 55% by weight, by means of treatment with steam, with simultaneous evacuation of the gas space above the dispersion, characterized in that 5% to 50% by weight, preferably 15% to 35% by weight, of the steam blown into the dispersion is blown uncondensed through the dispersion.

More particularly, the present invention relates to an improvement in the process for steam-stripping residual monomer from an aqueous polymer dispersion comprising injecting steam into an aqueous polymer dispersion containing residual monomers and the customary amounts of emulsifiers and/or protective colloids, said dispersion having a solids content of from 15% to 55% by weight with simultaneous evacuation of the gas space above the dispersion whereby said gas space is maintained at a subatmospheric pressure and said residual monomers are volatilized, the improvement consisting of injecting a sufficient volume of steam into said aqueous polymer dispersion whereby from 5% to 50% by weight of the injected steam passes through said dispersion uncondensed, thereby substantially preventing formation of foam above said dispersion.

As a result of the process of the invention, wherein steam is passed into, and through, aqueous polymer dispersions, foaming no longer occurs so that it is even possible in the great majority of cases, to dispense with the use of anti-foam agents in the degassing process which follows the polymerization process. This results in more rapid removal of the residual monomer, a lower remaining residual monomer content and gentler treatment of the product.

For this purpose, the steam can be introduced into the autoclave at one or more points, for example, through the bottom valve of through steam inlet nozzles fitted in the side. The direction in which the steam is blown in can be, for example, horizontal, or upwards, or from the side, at a downward angle. To achieve sufficient mixing of the steam with the polymerization product it is advantageous to locate the point at which the steam is injected at a level below the liquid level which is not less than one-quarter of the total filling height of the autoclave. Equally, it has proved advantageous to mix the injected steam with the dispersion by means of known static, mechanical or dynamic mixing devices. In the case of dispersions of high emulsifier content it is advantageous to introduce the steam in a zone which is below the liquid level by an amount between one-quarter and three-quarters of the total filling height.

Surprisingly, apart from minimal foaming in the starting stage, foaming no longer occurs during the degassing process when polymerization dispersions, which contain customary amounts of emulsifiers and/or protective colloids, are subjected to the treatment according to the invention. This is all the more surprising since the foam development cannot be combated successfully by treating the foam phase above the liquid level with steam in accordance with conventional procedures. In the case of dispersions with a high emulsifier content, large-celled lamellae may form, but these readily burst again.

The process for combating foam is effective with polymer dispersions which have been manufactured by customary polymerization processes. Such polymer dispersions, in general, contain homopolymers or copolymers, with a solids content of 15% to 55% by weight in the aqueous phase. The aqueous polymer dispersions are produced from ethylenically-unsaturated monomers which are volatilized by the action of steam at subatmospheric pressures. The following may be mentioned as representative ethylenically unsaturated monomers which may be present in the homopolymers or copolymers; olefins, such as lower alkenes, styrene, substituted styrenes, acrylic monomers and substituted acrylic monomers, vinyl esters of lower alkanoic acids, such as, for example, vinyl acetate, vinyl ethers, vinyl ketones, alkene dicarboxylic acids and their monoesters and diesters, vinyl halides and especially homopolymers and copolymers of vinyl chloride. The process is particularly effective for the steam-stripping of aqueous dispersions of polyvinyl chloride and copolymers containing from 5% to 95% by weight of monomers, of vinyl chloride.

The polymer dispersions can have been manufactured either by the emulsion polymerization process or the suspension polymerization process. In general, such polymer dispersions contain emulsifiers in amounts of 0.01% to 2% by weight, based on the monomer, and/or protective colloids in amounts of 0.05% to 2% by weight, based on the monomers employed.

The protective colloids are those customarily employed in the preparation of aqueous polymer dispersions, such as polyvinyl alcohols, partially acetylated polyvinyl alcohols, water-soluble cellulose derivatives, water-soluble starch ethers, polyacrylic acid and acrylic acid copolymers, and polyvinylpyrrolidone, especially partially saponified or completely saponified polyvinyl alcohols.

Likewise, the emulsifiers are those customarily employed in the preparation of aqueous polymer dispersions, such as nonionic, anionic and cationic emulsifiers.

In the degassing process, steam is passed into the polymer dispersion which has been depressurized and which is still warm. Steam is to be understood, in this context, as wet, saturated or non-saturated steam at a pressure in the range from 2 to 10 bars and at a temperature of between 115° C. and 180° C. Usually, saturated steam is employed. Of course, the steam pressure range can be extended further in either direction, but it has been found that pressure ranges below 2 bars require injection tubes of excessive size while pressure ranges above 10 bars do not offer any decisive advantage in the present context. The gas space above the polymer dispersion is evacuated continuously while the steam is blown in. Pressure conditions of below 1 bar and down to 0.5 bar can be found in the gas space above the dispersion during this process. Since, during the degassing process, the polymer dispersion assumes an equilibrium temperature of about 70° C. to 85° C., it is not advisable to evacuate the gas space to a pressure of less than 0.5 bar. In general, the subatmospheric pressure set up will be slightly below the equilibrium vapor pressure of the water or of the polymer batch at the degassing temperature.

Static mixers are to be understood, in the present context, as mixing tubes with the design details which characterize static mixers; examples of mechanical mixers are stirrers, while dynamic mixers are, for example, Venturi mixing jets. It is preferable to employ some type of mixing of the injected steam with the polymer dispersion.

The process according to the invention will be made particularly clear by the example of removing the residual vinyl chloride from a PVC suspension copolymer in an autoclave. If, for example, a vacuum is applied to a fully polymerized suspension polyvinyl chloride batch, a foam layer forms but this can be kept within reasonable limits by, for example, adding chemical anti-foam agents. If steam is blown into the autoclave through the bottom valve, and the blown-in steam condenses in the suspension, it causes such intense foaming at the suspension surface, in spite of the addition of anti-foam agents, that degassing, under reduced pressure, of the free gas space above the dispersion can no longer be conducted with the reduced pressure valve completely open. If, however, in accordance with the invention, the introduction of steam is increased, a point is reached where uncondensed steam passes through the suspension to the suspension surface. Surprisingly, foaming immediately regresses and the steam leaving the surface can be removed unhindered, together with the simultaneously issuing vinyl chloride, through the vacuum line. The same effect can be achieved if instead of increasing the amount of steam usually blown in through the bottom valve, the liquid level of the polymer dispersion is lowered. Under these conditions it is again possible to achieve a state where uncondensed steam penetrates the surface of the suspension, and foaming regresses.

It has furthermore been proven to be advantageous in that, if the stripping steam has an unhindered passage through the suspension, less heat of condensation is transferred to the product. As a result, the product withstands several hours' exposure to steam without thermal degradation. Compared to conventional processes, the residual monomer content can be lowered in a shorter time and to lower values.

The examples which follow are intended to illustrate the invention without being limitative thereof in any respect.

EXAMPLE 1 (comparative example)

A 25.5 $m^3$ $V_2A$ autoclave with impeller and flow disturbers contained, after completion of polymerization, 22 $m^3$ of a suspension which has a 48% by weight solids content, the copolymer having a vinyl chloride/vinyl acetate ratio of 15:85% by weight, a K value of 50 and an average particle size of 150 $\mu$m. The autoclave was filled to a height of 3.6 m. Above the liquid level there was a residual gas space 50 cm (0.5 m) high. The polymer dispersion contained 18 kg of polyvinyl alcohol (with a saponification number of 190). After one hour's treatment under reduced pressure, at 70° C. and 0.6 bar, without blowing in steam, the following residual monomer contents of the polymer in the suspension are measured by gas chromatography:

Vinyl chloride: 3,000 ppm
Vinyl acetate: 8,000 ppm 3 tonnes of steam (4 bars/145° C.) were now passed in through the bottom valve during three hours, while keeping the autoclave contents at 90° C. Though a solution of anti-foam agent (300 gm of Wacker Silicon, a 45% strength by weight polydimethylsiloxane emulsion, per 100 l of water) was introduced during the continuous degassing process, the foam layer above the polymer dispersion rises to a height where the removal of the stripping steam must be cut down by throttling the reduced pressure valve. During the degassing, the 3 tonnes of steam introduced, condensed in the suspension. The amount of steam removed through the reduced pressure valve was at most 1 tonne and the level of the suspension rose during the steam treatment so that after two hours' degassing under reduced pressure the reduced pressure valve must be closed almost completely. After this treatment, the suspension had a deep yellow color, which indicates thermal degradation of the product. The residual monomer content of the polymer of the suspension at the end of the treatment is:

Vinyl chloride: 500 ppm
Vinyl acetate: 2,000 ppm

Throughout the treatment, the impeller was in operation.

EXAMPLE 2 (according to the invention)

The same conditions as in Example 1 apply in respect of the autoclave and the suspension. After one hour's treatment under reduced pressure, at 70° C. and 0.7 bar, without introduction of steam, steam was introduced, not through the bottom valve, but through a bent tube which dipped 1.80 m deep into the suspension (about one half the distance from the bottom of the polymerization surface). 3 tonnes of steam at 4 bars/145° C. were introduced continuously over the course of three hours at an internal temperature of the dispersion of 90° C. About 15% of the injected steam passed uncondensed through the suspension surface and thus prevented the formation of a thick layer of foam. The reduced pressure valve can be left completely open during the entire three hours' steam treatment and, hence, the stripping steam can be drawn through unhindered. During the steam treatment the suspension liquid level did not rise, and the product did not suffer thermal degradation. After carrying out the steam treatment, the suspension polymer was found to have a residual monomer content of 40 ppm of vinyl chloride and 800 ppm of vinyl acetate. Again, the impeller was in operation throughout the procedure.

EXAMPLE 3 (according to the invention)

The procedure followed was as in Example 2, except that the steam inlet tube only dipped 1.3 m below the liquid level and a Venturi jet was fitted before the steam outlet orifice. After again introducing 3 tonnes of steam at 4 bars/145° C. in the course of three hours, with the reduced pressure valve completely open, the suspension polymer, which had not undergone thermal degradation, was found to have a residual monomer content of 25 ppm of vinyl chloride and 500 ppm of vinyl acetate. About 25% of the injected steam passed uncondensed through the suspension surface.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process for steam stripping residual monomer from an aqueous polymer dispersion prepared in an autoclave comprising injecting steam into an aqueous polymer dispersion containing polymers selected from the group consisting of polyvinyl chloride and copolymers of at least one monomer copolymerizable with vinyl chloride and from 5% to 95% by weight of vinyl chloride, and from 0.01% to 2% by weight of emulsifiers and/or from 0.05% to 2% by weight of protective colloids, said dispersion having a solids content of from 15% to 55% by weight with simultaneous evacuation of the gas space above the dispersion whereby said gas space is maintained at a subatmospheric pressure and said residual monomers are volatilized, the improvement consisting of injecting a sufficient volume of steam at a pressure in the range from 2 to 10 bars and a temperature of between 115° C. and 180° C. into said aqueous polymer dispersion at one or more points below the liquid level of said aqueous polymer dispersion within a zone of between one-quarter and three-quarters of the toal height of said aqueous polymer dispersion, through a static mixing device, mechanical mixing device or dynamic mixing device, while said gas space is maintained at subatmospheric pressures down to 0.5 bar, whereby from 5% to 50% by weight of the injected steam passes through said dispersion uncondensed, thereby substantially preventing formation of foam above said dispersion.

2. The process of claim 1 wherein from 15% to 35% by weight of the injected steam passes through said dispersion uncondensed.

3. The process of claim 1 wherein said monomer copolymerizable with vinyl chloride is vinyl acetate.

* * * * *